(12) United States Patent
Vaikar et al.

(10) Patent No.: US 11,477,089 B2
(45) Date of Patent: Oct. 18, 2022

(54) RACK-AWARE AND NETWORK PERFORMANCE-AWARE SERVICE DEPLOYMENT

(71) Applicant: VMWARE, INC., Palo Alto, CA (US)

(72) Inventors: Amol Manohar Vaikar, Pune (IN); Avinash Nigam, Pune (IN); Prahalad Deshpande, Pune (IN); Ambarish Pande, Pune (IN)

(73) Assignee: VMWARE, INC., Palo Alto, CA (US)

( * ) Notice: Subject to any disclaimer, the term of this patent is extended or adjusted under 35 U.S.C. 154(b) by 80 days.

(21) Appl. No.: 17/172,123

(22) Filed: Feb. 10, 2021

(65) Prior Publication Data

US 2022/0182288 A1 Jun. 9, 2022

(30) Foreign Application Priority Data

Dec. 3, 2020 (IN) .............................. 202041052652

(51) Int. Cl.
| | |
|---|---|
| *G06F 15/173* | (2006.01) |
| *H04L 41/12* | (2022.01) |
| *H04L 41/083* | (2022.01) |
| *H04L 43/065* | (2022.01) |
| *H04L 41/5041* | (2022.01) |
| *H04L 41/08* | (2022.01) |
| *H04L 41/082* | (2022.01) |
| *H04L 41/0823* | (2022.01) |
| *H04L 41/0893* | (2022.01) |

(52) U.S. Cl.
CPC ............ *H04L 41/12* (2013.01); *H04L 41/082* (2013.01); *H04L 41/083* (2013.01); *H04L 41/0823* (2013.01); *H04L 41/0883* (2013.01); *H04L 41/0893* (2013.01); *H04L 41/5045* (2013.01); *H04L 43/065* (2013.01)

(58) Field of Classification Search
CPC ... H04L 41/5045; H04L 41/12; H04L 41/082; H04L 43/065
USPC ................................ 709/223, 224, 226, 229
See application file for complete search history.

(56) References Cited

U.S. PATENT DOCUMENTS

| | | |
|---|---|---|
| 7,975,165 B2 | 7/2011 | Shneorson et al. |
| 9,164,800 B2 | 10/2015 | Alicherry et al. |

(Continued)

*Primary Examiner* — Lan Dai T Truong
(74) *Attorney, Agent, or Firm* — Patterson & Sheridan, LLP

(57) ABSTRACT

The disclosure provides an approach for service deployment. Embodiments include receiving an indication of user intent for deployment of one or more services in a network from a user that is not an administrator of the network, wherein the indication of the user intent comprises a domain specific language (DSL). Embodiments include parsing the indication of the user intent to determine one or more constraints for deploying the one or more services. Embodiments include receiving topology information for the network, wherein the topology information comprises associations between racks and machines in the network. Embodiments include receiving network performance information for the network. Embodiments include determining one or more deployment rules for the one or more services based on the one or more constraints, the topology information, and the network performance information. Embodiments include deploying the one or more services in the network based on the one or more deployment rules.

20 Claims, 9 Drawing Sheets

(56) References Cited

U.S. PATENT DOCUMENTS

| | | | |
|---|---|---|---|
| 9,268,590 B2 | 2/2016 | Du et al. | |
| 9,294,407 B2 | 3/2016 | Antony | |
| 9,325,739 B1 * | 4/2016 | Roth | G06F 21/604 |
| 9,582,221 B2 | 2/2017 | Du et al. | |
| 9,621,427 B1 | 4/2017 | Shah et al. | |
| 9,851,906 B2 | 12/2017 | Sarkar et al. | |
| 9,855,308 B2 | 5/2018 | Sarkar et al. | |
| 10,050,850 B2 | 8/2018 | Du et al. | |
| 10,250,443 B2 | 4/2019 | Chandrasekhar et al. | |
| 10,776,149 B2 | 9/2020 | Kommula et al. | |
| 2015/0074262 A1 | 3/2015 | Antony | |
| 2015/0341223 A1 | 11/2015 | Shen et al. | |
| 2017/0149880 A1 | 5/2017 | Lochhead et al. | |
| 2017/0302523 A1 | 10/2017 | Shah et al. | |
| 2018/0121250 A1 | 5/2018 | Qi et al. | |
| 2018/0139148 A1 | 5/2018 | Gamage et al. | |
| 2019/0188050 A1 | 8/2019 | Tsai et al. | |
| 2020/0201665 A1 | 6/2020 | Panse et al. | |

\* cited by examiner

900

Input: Service Constraint Table
Input: Service as S
Input: Host as H
Input: Service to Host Table as (S2H)
Input: Host Network Performance (NP) Clusters as (clusters)
Output: true: if Constraints are Satisfied; false: if Constraints are not Satisfied 1: Get Services involved in Network Constraint (ncServices) from SERVICE CONSTRAINT TABLE for Service S
2: for each Service (ncService) in ncServices do
3:   if ncService is in S2H and Host H is not in same cluster as Host of ncService then
4:     return false
5:   end if
6: end for
7: Get Services involved in Colocation (coloServices) from SERVICE CONSTRAINT TABLE for Service S
8: for each Service (coloService) in coloServices do
9:   if coloService is in S2H and H is not equal to Host of coloService then
10:     return false
11:   end if
12: end for
13: Get Services involved in Isolation (isoServices) from SERVICE CONSTRAINT TABLE for Service S
14: for each Service (isoService) in isoServices do
15:   if isoService is in S2H and H is equal to Host of isoService then
16:     return false
17:   end if
18: end for
19: return true

FIG. 9

RACK-AWARE AND NETWORK PERFORMANCE-AWARE SERVICE DEPLOYMENT

RELATED APPLICATIONS

Benefit is claimed under 35 U.S.C. 119(a)-(d) to Foreign Application Serial No. 202041052652 filed in India entitled "RACK-AWARE AND NETWORK PERFORMANCE-AWARE SERVICE DEPLOYMENT", on Dec. 3, 2020, by VMware, Inc., which is herein incorporated in its entirety by reference for all purposes.

BACKGROUND

A software-defined data center (SDDC) may comprise a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software-defined networks, (SDNs) also referred to herein as logical overlay networks, that may span multiple hosts and are decoupled from the underlying physical network infrastructure.

An application running in a data center may be split into a number of smaller services, referred to as "microservices" that can communicate with each other (e.g., using well-defined application programming interfaces (APIs). Each microservice may be containerized and hence, run in a container, such as a namespace container. Each different microservice can run on a different machine (e.g., host, VM, etc.) within the data center, and further, the same microservice may be distributed among several machines that each run a copy of the same microservice to handle requests from multiple clients in a distributed, scale-out fashion. Accordingly, an application may be divided into a number of tiers, each tier corresponding to a microservice of the application. Each tier may further run on one or more machines, meaning that the microservice associated with the tier runs in a distributed fashion on one or more machines. Such an architecture may specifically be used for running cloud native applications in a cloud data center, such as an enterprise private cloud, or a public cloud datacenter, such as a hyperscale public cloud. A cloud datacenter is datacenter that provides automated allocation of compute and storage, infrastructure services, and often additional services, to users. Thus, it is generally an elastic, on-demand, shared computing infrastructure delivered as a service. In the case of public clouds, these services are available via the Internet, typically with metered pricing.

An aspect that fundamentally impacts the performance and reliability/availability of such applications is the physical network topology associated with the machines in which the microservices are placed in the data center (e.g., within a cluster of machines in the data center). Two important aspects related to network topology are rack co-location of the machines and network performance, such as latency, between machines. Rack co-location may refer to whether physical hosts corresponding to the machines or on which the machines run are located on the same physical rack, which reduces communication latency as the physical hosts located on the same physical rack may be coupled to the same switch (referred to as a top-of-rack (TOR) switch). Network latency may refer to a latency time between when a source machine sends a packet and a destination machine receives the packet, or a round-trip-time (RTT) between machines. Latency is not simply a function of physical distance but also of network congestion along the path the packets follow due to queues built up in forwarding devices along the path.

Another aspect about applications running in a cloud data center is that while the applications are developed by developers, the actual infrastructure/machines on which the application is deployed is not controlled by the developer, nor can it be assumed that developers would have a-priori knowledge of the infrastructure (since the application may be accessed and deployed anywhere from an online registry). This introduces a problem where the developers may not have any control in deciding the placement of the microservices within the data center. For example, developers may be unable to control the racks on which microservices are deployed and may be unable to specify network performance constraints for placement of microservices.

Accordingly, there is a need in the art for improved techniques for rack-aware and network performance-aware service deployment.

BRIEF DESCRIPTION OF THE DRAWINGS

FIG. 9 depicts pseudocode for verifying service constraints.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
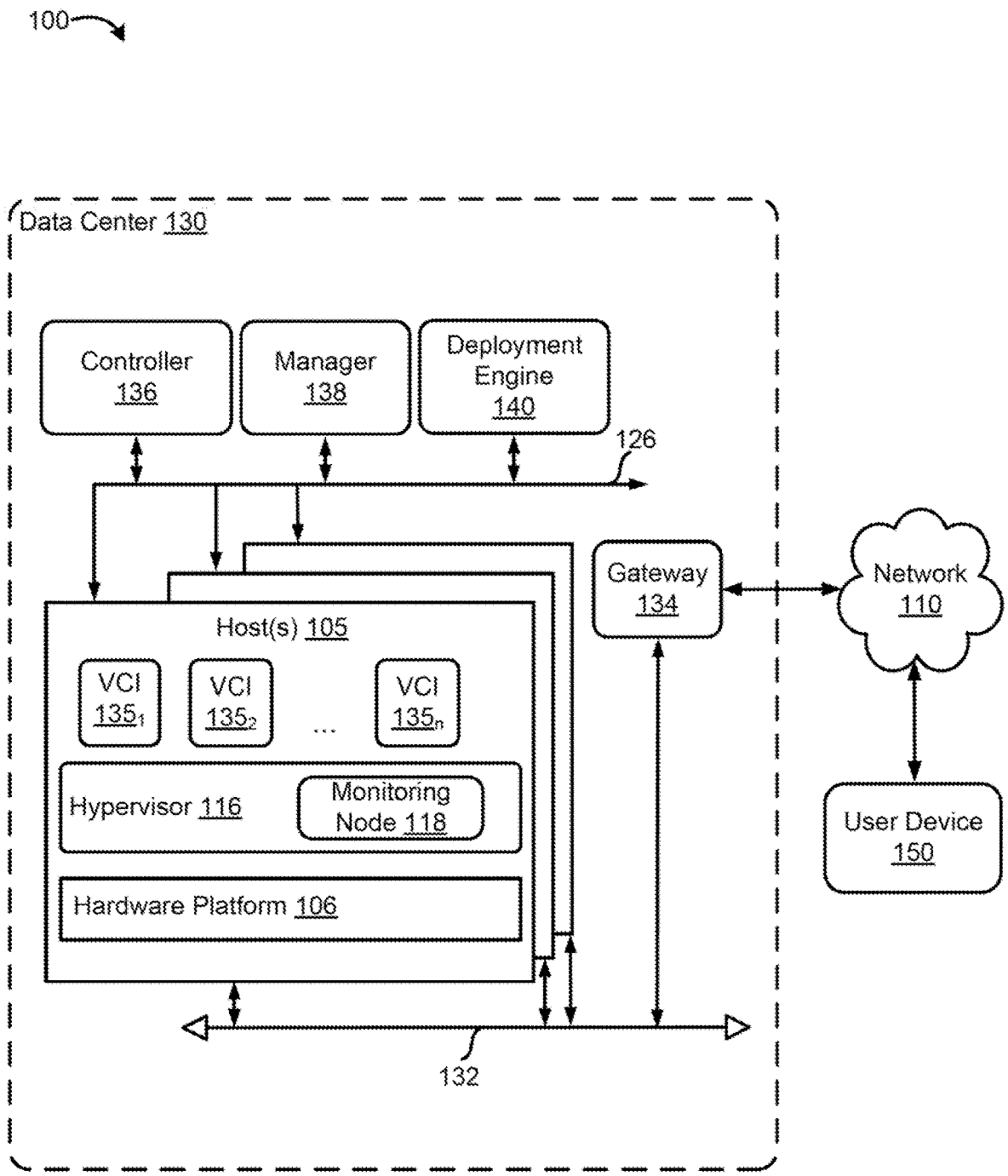
FIG. 1 depicts example physical and virtual network components with which embodiments of the present disclosure may be implemented.

The present disclosure provides an approach for rack-aware and network performance-aware service deployment in a networking environment. In particular, techniques described herein allow a user, such as a software developer or other consumer of cloud resources, to specify rack and network performance constraints for deployment of services using a domain specific language (DSL). For example, the domain specific language may comprise a JavaScript Object Notation (JSON) or extensible markup language (XML) file written to a specific schema. The services may be containerized services running in containers. The domain specific language code is interpreted to determine constraints for placement of services on machines (e.g., physical computing devices, VCIs, etc.) in the network, and the constraints may be implemented based on dynamically-determined topology information and network performance information for the network.

For example, a deployment engine may be configured to parse code or parameters written in domain specific language in order to identify specific user-defined constraints. The constraints may include, for example, whether certain microservices are to be deployed on the same or different racks, maximum latency allowed between two given microservices maximum round trip time (RTT) allowed between two given microservices, and the like. The deployment engine may gather topology information and network performance information from one or more components in the network, such as from monitoring nodes on hosts, physical routers, physical switches, and/or from a manager. The topology information may indicate which machines (e.g., hosts, VCIs, and the like) are located on which racks. The network performance information may include, for example, latency and RTT values between pairs of machines, such as the current latency or RTT between two given machines. Latency and RTT are included as examples, and other types of network performance information may be gathered and used in deployment rules. For example, other types of network performance information that may be used with techniques described herein include network throughput (e.g., average data rate of successful packet delivery), bandwidth availability (e.g., how much data can be transmitted per time period), packet loss rate (e.g., the average rate over which transmitted packets are dropped), and the like. References to comparison with a threshold may refer to either an upper threshold (e.g., for network performance information that are intended to be minimized, such as latency) or a lower threshold (e.g., for network performance information that are intended to be maximized, such as throughput).

A constraint, as used herein, generally refers to a requirement that must be met when deploying one or more services. For example, a network performance constraint may specify an upper and/or lower threshold that must be met with respect to values of one or more types of network performance information. Network performance information generally includes measured values, such as measured latency or RTT values. A topology constraint may, for example, comprise a rule related to topological placement of a service.

The deployment engine may then generate deployment rules based on the constraints and the topology and network performance information. For instance, a deployment rule may specify that two particular microservices may not be respectively deployed on two given machines because the amount of latency between the two given machines is too high. In some cases the deployment engine may determine that deployment is not possible according to the constraints defined by the user. If deployment is not possible, the deployment engine may notify the user of the reason or reasons why deployment is not possible. If deployment is possible, the deployment engine deploys the services on machines in the network according to the deployment rules.

FIG. 1 depicts example physical and virtual network components with which embodiments of the present disclosure may be implemented.

Networking environment 100 includes data center 130 and user device 150 connected to network 110. Network 110 is generally representative of a network of machines such as a local area network ("LAN") or a wide area network ("WAN"), a network of networks, such as the Internet, or any connection over which data may be transmitted.

User device 150 may include a web browser or other application that generates requests to deploy and/or access an application running on one or more machines within data center 130. The application may be split into a number of smaller services, referred to as "microservices" that can communicate with each other.

Data center 130 generally represents a set of networked machines, and may comprise a logical overlay network. Data center 130 includes host(s) 105, a gateway 134, a data network 132, which may be a Layer 3 network, and a management network 126. Host(s) 105 may be an example of machines. For example, a containerized microservice may run directly on a host 105. Data network 132 and management network 126 may be separate physical networks or different virtual local area networks (VLANs) on the same physical network.

It is noted that, while not shown, additional data centers may also be connected to data center 130 via network 110.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines. For example, a containerized microservice may run on a VCI 135.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. In certain embodiments, microservices may run on host 105 without the use of a hypervisor.

Hypervisor 116 comprises a monitoring node 118 that gathers data related to host 105 and/or VCIs 135, such as network performance and/or topology information. In some embodiments, monitoring node 118 is one component of a distributed monitoring system that gathers metrics for endpoints throughout data center 130. It should be recognized that in a cloud environment as described herein, network topology, such as rack information, and network performance information, such as latency information, may not be directly available to the user (e.g., of user device 150) since the user does not have access to the data center in which the cluster operates. Accordingly, embodiments of the present disclosure may abstract the implementation details away from the user such that the user may specify constraints for service deployment related to rack placement and network performance and the constraints are automatically interpreted and implemented based on data gathered by components such as monitoring node 118. In some embodiments, techniques described herein may be implemented in networking environments with multiple data centers. Network performance-aware placement may be particularly useful when services communicate across data centers, as certain network performance information such as latency or RTT may be greater between separate data centers (e.g., in different geographic locations) than within a single data center. For example, services may run on machines that are in different data centers. Communication via the different data centers may be performed via gateways associated with the different data centers.

Gateway 134 provides VCIs 135 and other components in data center 130 with connectivity to network 110, and is used to communicate with destinations external to data center 130, such as user device 150. Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

Deployment engine 140 generally represents one or more components that perform operations related to rack-aware and network performance-aware service deployment. For example, as described in more detail below with respect to FIGS. 2-5, deployment engine 140 may receive deployment constraints from user device 150 and deploy services according to the deployment constraints in view of network topology information and network performance information gathered from components such as monitoring node 118 and manager 138.

Figure 2:
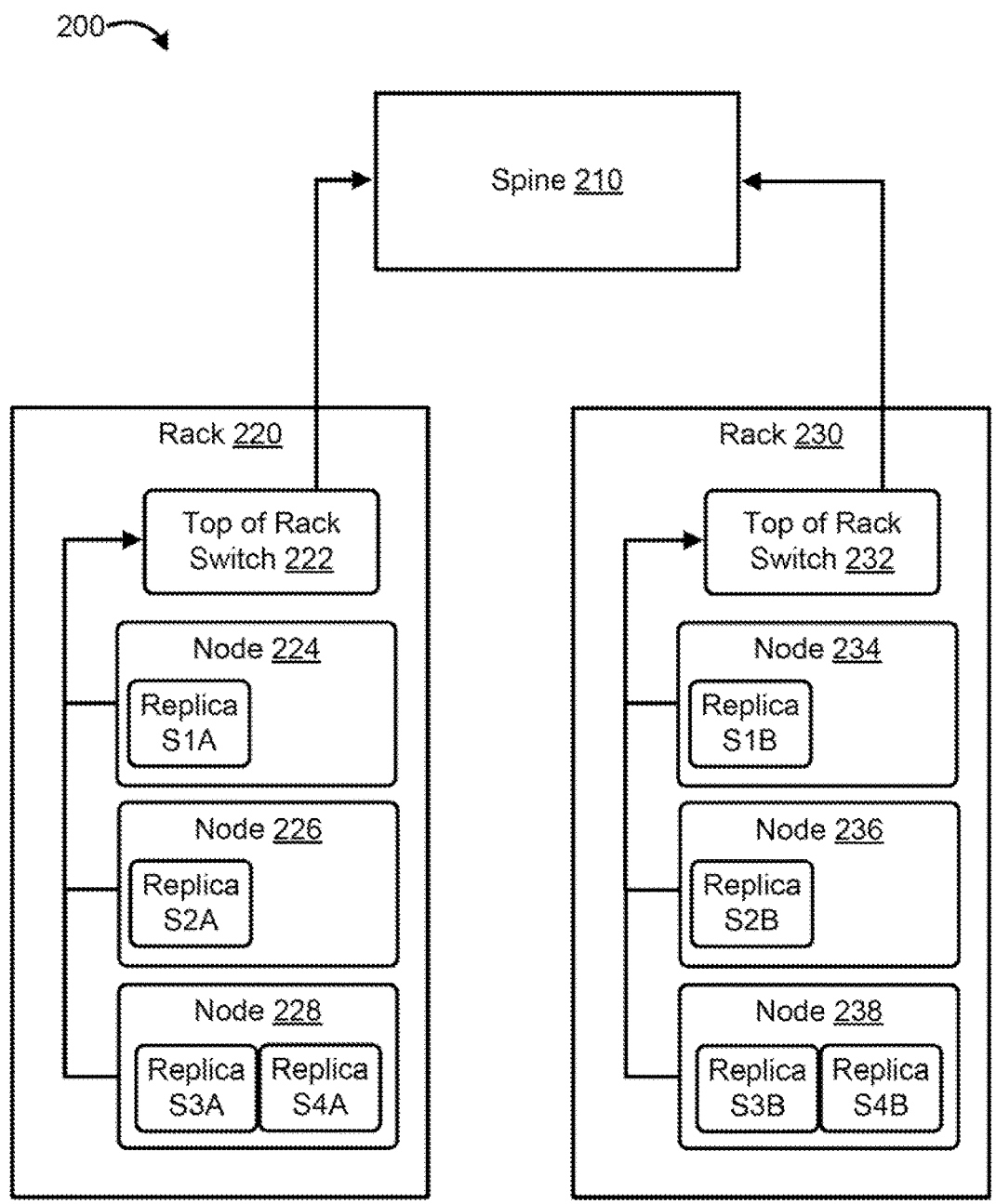
FIG. 2 depicts an example of service deployment according to embodiments of the present disclosure.

FIG. 2 shows an example service deployment 200 that may be deployed in data center 130 of FIG. 1. For example, nodes 224, 226, 228, 234, 236, and 238 may represent machines, such as one or more of hosts 105 and/or VCIs 135 of FIG. 1.

Racks 220 and 230 are connected to one another via top of rack switches 222 and 223 and spine switch 210. Nodes 224, 226, 228, 234, 236, and 238 represent machines that are located on or are servers within racks 220 and 230. In one example, hosts 105 of FIG. 1 may be servers in racks 220 and 230, and nodes 224, 226, 228, 234, 236, and 238 may be VCIs 135, such as VMs, running on hosts 105 of FIG. 1. In another example, hosts 105 of FIG. 1 may be may be servers in racks 220 and 230 and also be the nodes 224, 226, 228, 234, 236, and 238. The nodes may also include a combination of physical and virtual machines.

Each rack includes multiple host computing devices in a cluster of host computing devices. Topology information for the network may indicate which nodes run on which hosts and/or which hosts are located on which racks. As such, the topology information indicates associations between nodes and racks. For example, topology information may indicate that nodes 224, 226, and 228 are located on rack 220, while nodes 234, 236, and 238 are located on rack 230.

In FIG. 2, four microservices (S1, S2, S3, and S4) are deployed as container workloads on nodes in racks 220 and 230. Each microservice has multiple instances or replicas. According to embodiments of the present disclosure, a user may specify criteria for deploying the microservices, including rack and network performance criteria, using a domain specific language. The domain specific language is then interpreted to determine constraints on placement of the microservices, which are then implemented based on dynamically-determined topology and network performance information. Use of a domain specific language allows the user to specify criteria for service deployment without having knowledge of the underlying management software of the data center(s) on which the services are to be deployed, as the user will not have to directly interface with such management software. Rather, the criteria specified by the user in the domain specific language will be converted into primitives that can be understood by the management software of the data center(s).

In an example, the following criteria are defined for deployment of microservices S1, S2, S3, and S4: (1) S1 must be highly available, and so no two instances of S1 may be located on the same node; (2) S1 and S2 must be co-located on the same rack in order to achieve optimum performance; and (3) the maximum allowed network latency between S3 and S4 is 100 milliseconds.

Ensuring that these constraints are met is beyond the control of the user using conventional techniques for service deployment in cloud datacenters. This shortcoming with conventional techniques would mean that, while developers can rapidly deploy an application, they cannot provide a placement specification to tune performance of the application on demand.

Some existing placement methodologies are based on the use of static labels on the nodes and in the application specification files. As such, any change to the nodes, clusters, or the application specification may require intervention from an operations team to ensure that the application continues to be deployed as per developer expectations/constraints.

Network performance fluctuations are temporal in nature and could be very sporadic or of bursty nature. Any approach that requires the developers and/or the operations teams to monitor the application interaction and repeatedly tune policies would not be scalable. Thus, techniques described herein allow deployment criteria to be automatically implemented based on dynamically determined topology and network performance information. For example, implementing criteria 1, 2, and 3 identified above may involve deploying microservices S1, S2, S3, and S4 as shown in FIG. 2.

In order to implement criterion 1, replicas S1A and S1B (e.g., a first and second instance of microservice S1) are deployed, respectively, on nodes 224 and 234, and thus are not co-located on the same rack. It may also be possible to require that the instances S1A, S1B be deployed on separate physical computer systems irrespective whether deployed on the same rack (or possibly even a preference to be deployed on the same rack) in which case replicas S1A, S1B may be placed on separate physical computers, but on the same rack. Having such anti-affinity rules will the likelihood that a single hardware failure can take both replicas S1A, S1B offline. Accordingly, microservice S1 will be highly available.

In order to implement criterion 2, replicas S1A and S2A are co-located on the same rack 220 and replicas S1B and S2B are co-located on the same rack 230. Thus, each instance of microservice S1 is co-located on the same rack as an instance of microservice S2.

In order to implement criterion 3, replicas S3A and S4B are co-located on the same node 228 and replicas S3B and S4B are co-located on the same node 238. In each of these cases, latency between an instance of microservice S3 and an instance of microservice S4 should be below the maximum value of 100 milliseconds, as they are co-located on the same node.

It is noted that the deployment arrangement shown in FIG. 2 is an example, and other deployment arrangements are possible in order to implement criteria 1, 2, and 3. For example, if network performance information indicates that latency between nodes 226 and 228 is below 100 milliseconds, then replica S3A could be located on node 226 and replica S4A could be located on node 228. Furthermore, if network performance or topology information changes, the deployment arrangement may be dynamically changed in response, such as by relocating or redeploying instances of microservices in more preferred locations.

Figure 3:
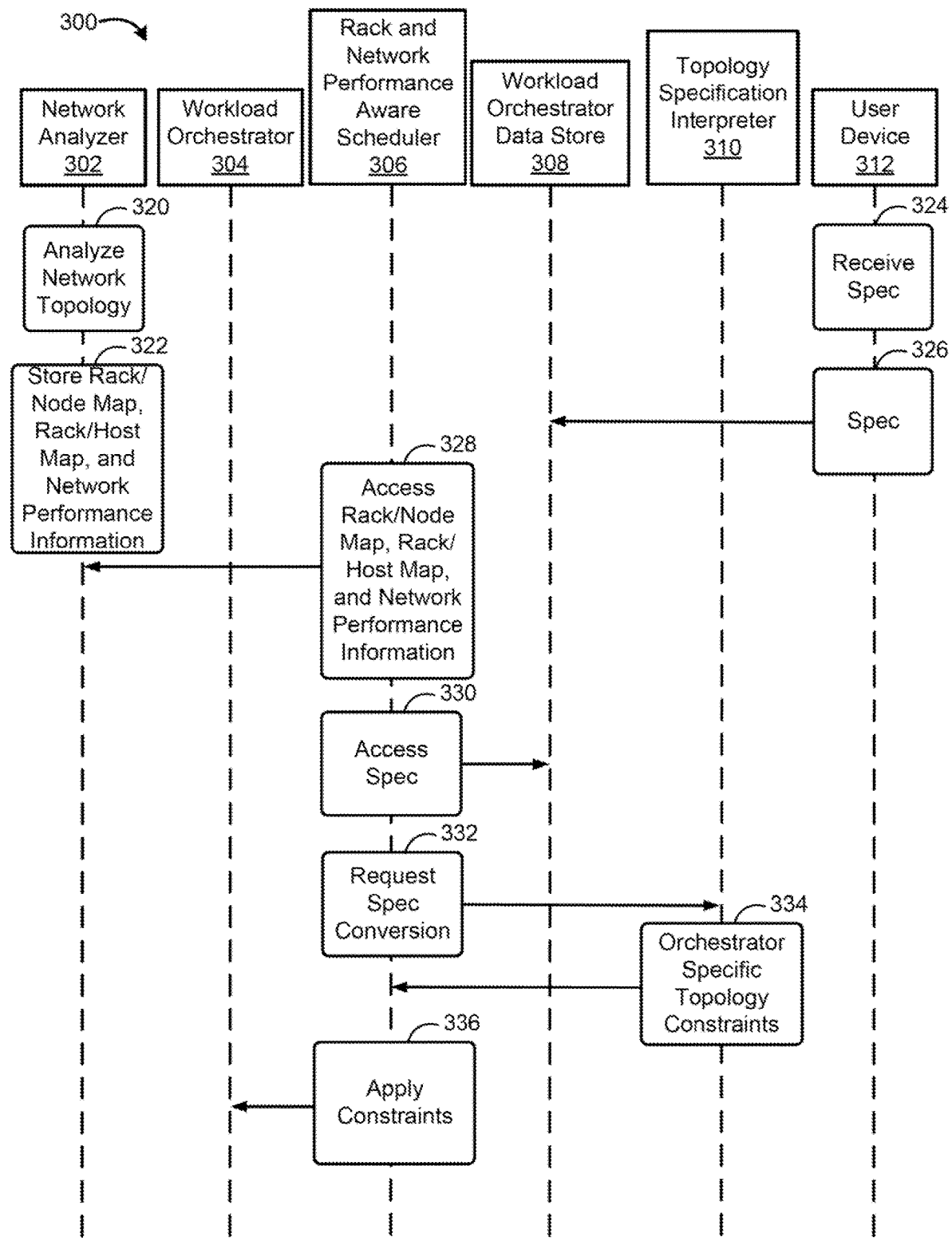
FIG. 3 depicts another example of service deployment according to embodiments of the present disclosure.

FIG. 3 shows a time-space diagram 300 illustrating by way of example an exchange of messages between components for service deployment. FIG. 3 shows user device 312, which may represent a device similar to user device 150 of FIG. 1. FIG. 3 further includes network analyzer 302, workload orchestrator 304, rack and network performance aware scheduler 306, workload orchestrator data store 308, and topology specification interpreter 310, all of which may be components of deployment engine 140 of FIG. 1. These components may be implemented on a single device or may be distributed across a plurality of devices, such as a plurality of VCIs 135 of FIG. 1.

At 320, network analyzer 302 analyzes the topology of the network. In some embodiments, network analyzer 302 receives network topology information from manager 138 of FIG. 1, physical routers, physical switches, and/or from components on hosts (e.g., monitoring component 118 of FIG. 1). Analyzing the network topology may involve determining associations between nodes and racks.

At 322, network analyzer 302 stores mappings between racks and nodes, optionally mappings between racks and hosts, and network performance information. The network performance information may be collected from one or more metric-gathering components in the network (e.g., monitoring component 118 of FIG. 1), and may include, for example, latency and/or RTT values between pairs of nodes. In some embodiments, network analyzer 302 regularly updates the mapping information and the network performance information based on current conditions in the network so that the stored data remains up-to-date.

At 324, user device 312 receives a deployment specification from a user. The deployment specification may be provided by the user in a domain specific language, and may indicate criteria for deployment of one or more services (e.g., microservices).

In an example, the domain specific language includes keywords and/or variables that are used to define criteria for deployment. For example, a user may define a resource set including one or more services, and may specify placement criteria for the resource set using keywords such as "colocation" at the "host" level or "rack" level. In another example, the user may define a network constraint for a resource set by setting a "latency" variable (or a variable corresponding to a different type of network performance information), such as to the value of 10, such as meaning that latency between services in the resource set cannot exceed 10 milliseconds. These are included as examples, and many types of domain specific languages may be employed with techniques described herein.

At 326, the domain specification is stored in workload orchestrator data store 308. For example, workload orchestrator data store 308 may be a database, repository, or other data storage entity for storing data related to workload orchestrator 304 and other components of deployment engine 140 of FIG. 1.

At 328, rack and network performance aware scheduler 306 accesses the rack/node mapping information, optionally the rack/host mapping information, and the network performance information stored by network analyzer 302. At 330, rack and network performance aware scheduler 306 accesses the deployment specification stored in workload orchestrator data store 308.

At 332, rack and network performance aware scheduler 306 requests a conversion of the deployment specification by topology specification interpreter 310. Topology specification interpreter 310 generally performs operations for interpreting the domain specific language in which the deployment specification is provided and determining constraints for deployment of the services based on the interpretation. In one example, topology specification interpreter 310 converts the domain specification into a set of primitives that can be interpreted by an algorithm that implements rack-aware and network performance-aware service placement in view of topology information and network performance information for the network.

At 334, topology specification interpreter 310 provides orchestrator specific topology constraints (e.g., the results of the interpretation performed by topology specification interpreter 310 on the deployment specification) to rack and network performance aware scheduler 306.

At 336, rack and network performance aware scheduler 306 applies the constraints via workload orchestrator 304, which deploys the services according to the constraints. For example, rack and network performance aware scheduler 306 may determine deployment rules based on the constraints, the rack/node mapping information, the rack/host mapping information, and/or the network performance information. The deployment rules may be determined using an algorithm for rack-aware and network performance-aware service placement. Determining deployment rules may include, for instance, generating node network performance clusters that represent clusters of nodes such that all nodes in a given cluster would satisfy a given network performance constraint. Generation of node network performance clusters is described in more detail below with respect to pseudocode 600 of FIG. 6. Determining deployment rules may further include determining mappings of services to nodes based on the constraints. In some embodiments, a service constraint table is generated based on the developer's intent as described in more detail below with respect to pseudocode 700 of FIG. 7. Topology rules (e.g., including mappings of services to nodes) may then be generated based on the service constraint table as described in more detail below with respect to pseudocode 800 of FIG. 8. Rack and network performance aware scheduler 306 may provide the deployment rules to workload orchestrator 304, which may deploy the services on nodes according to the deployment rules. In some embodiments, verification that constraints are satisfied is performed as described in more detail below with respect to pseudocode 900 of FIG. 9. As described in more detail below with respect to FIG. 5, if deployment is not possible according to the constraints, output may be provided to the user device indicating that the deployment is not possible and/or providing an explanation of why deployment is not possible according to the constraints defined by the user.

Algorithms for rack-aware and network performance-aware service placement may include, for example, the algorithms represented by pseudocode discussed below with respect to FIGS. 6-9.

It is noted that the components shown in FIG. 3 are included as examples, and other sets of fewer or more components may be used to perform operations described herein.

Figure 4:
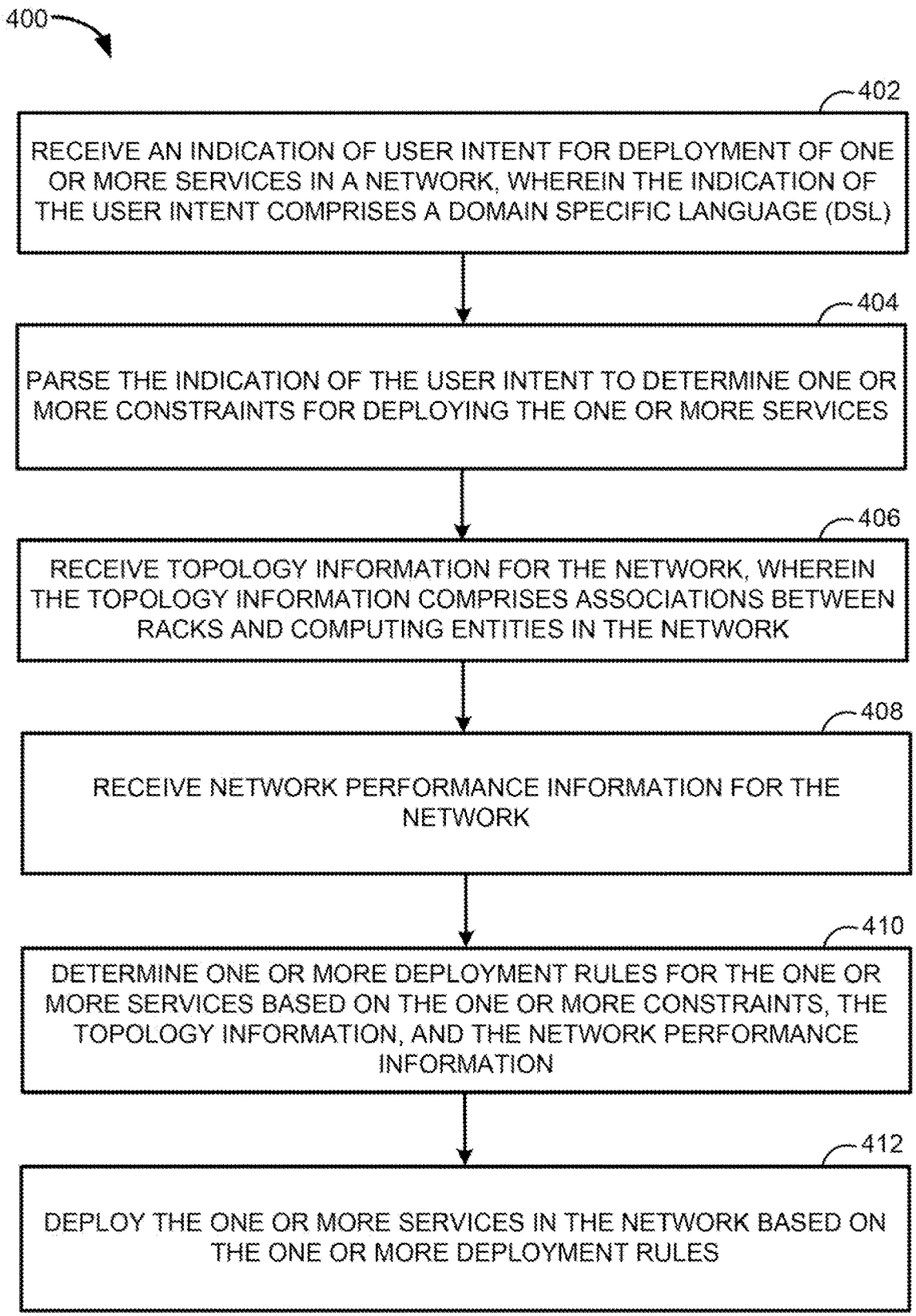
FIG. 4 depicts example operations for service deployment according to embodiments of the present disclosure.

FIG. 4 depicts example operations 400 for service deployment according to embodiments of the present disclosure. For example, operations 400 may be performed by one or more components of deployment engine 140 of FIG. 1.

At step 402, an indication is received of user intent for deployment of one or more services in a network, wherein the indication of the user intent comprises a domain specific language (DSL).

At step 404, the indication of the user intent is parsed to determine one or more constraints for deploying the one or more services.

At step 406, topology information is determined for the network, wherein the topology information comprises associations between racks and machines in the network.

At step 408, network performance information for the network is determined.

At step 410, one or more deployment rules for the one or more services are determined based on the one or more constraints, the topology information, and the network performance information.

At step 412, the one or more services are deployed in the network based on the one or more deployment rules.

Figure 5:
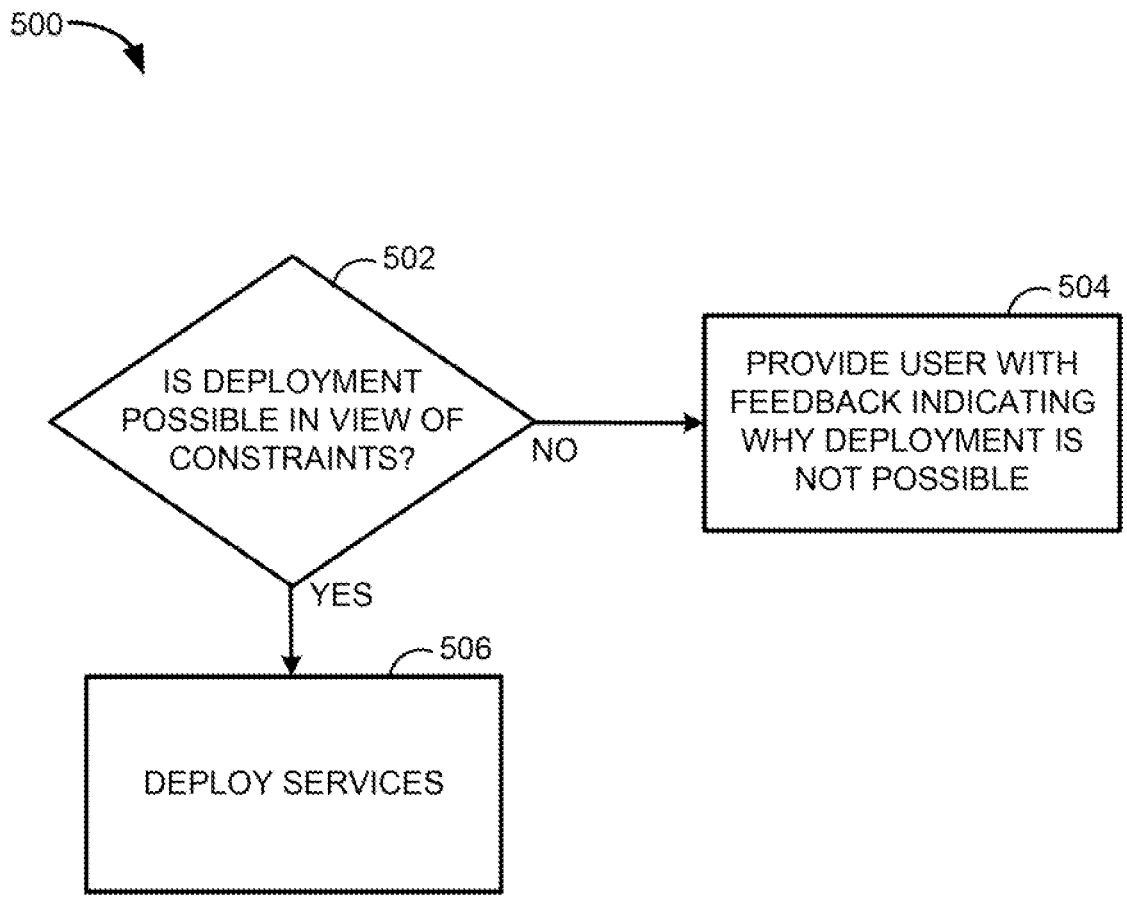
FIG. 5 depicts additional example operations for service deployment according to embodiments of the present disclosure.

FIG. 5 depicts additional example operations 500 for service deployment according to embodiments of the present disclosure. For example, operations 500 may be performed by one or more components of deployment engine 140 of FIG. 1 as part of steps 410 and/or 412 of FIG. 4.

At 502, it is determined whether deployment is possible in view of the constraints. For example, deployment engine 140 of FIG. 1 may determine based on analyzing topology information and network performance information for the network in view of the constraints (e.g., determined based on user intent) that no set of deployment rules will satisfy all constraints specified by the user.

In one example, a first constraint specifies that services S1 and S2 may not be co-located on the same rack and a second constraint specifies that services S1 and S2 must not have latency between them greater than 10 milliseconds. If there are not two nodes on separate racks with a latency value between them of 10 milliseconds or less in the network, then it is not possible to deploy services S1 and S2 according to the constraints.

If deployment is not possible in view of the constraints then, at 504, feedback is provided to the user (e.g., to user device 150 of FIG. 1) indicating why deployment is not possible. For example, the feedback may indicate that there are not two nodes on separate racks with a latency value between them of 10 milliseconds or less. The feedback may provide the user with information that may be used to revise the constraints such that deployment is possible. For example, the user may provide an updated indication of user intent in which the latency limit is raised or the rack co-location constraint is changed.

If deployment is possible in view of the constraints then, at 506, the services are deployed according to the constraints. For example, deployment rules may be determined, including mappings of services to nodes, and the services may be deployed on nodes according to the deployment rules.

Figure 6:
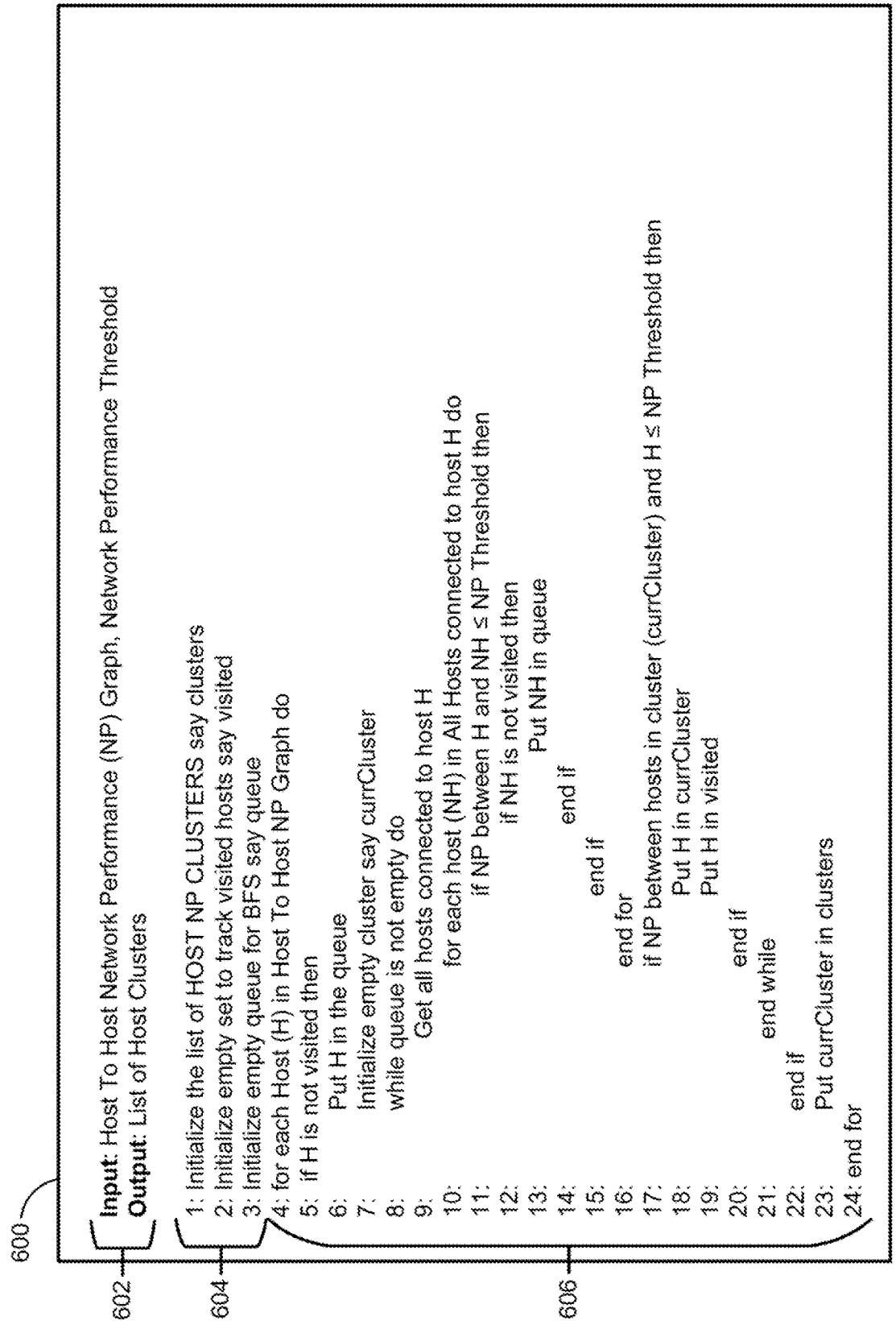
FIG. 6 depicts pseudocode for determining host network performance clusters.

FIG. 6 depicts pseudocode 600 of an algorithm for creating host network performance information clusters.

At pseudocode section 602, it is shown that inputs to the algorithm include a host-to-host network performance graph and a network performance threshold. The graph and threshold may correspond to any of a variety of network performance information. The graph may represent values for one or more network performance information with respect to pairs of hosts. An output to the algorithm is a list of host clusters.

At pseudocode section 604, variables are initialized, the variables including a list of host network performance clusters (clusters), an empty set to track visited hosts (visited), and an empty queue for a breadth first search (queue).

At pseudocode section 606, a number of operations are performed for each host H in the host-to-host network performance graph. If H has not yet been visited, then His put in queue. An empty cluster is initialized as currCluster. While queue is not empty, the following operations are performed: all hosts connected to H are retrieved (all hosts); and for each host NH in all hosts, if the network performance between H and NH is less than or equal to the network performance threshold and if NH has not yet been visited, then NH is put in queue.

If the network performance between hosts in cluster and H is less than or equal to the network performance threshold, then H is placed in currCluster and H is placed in visited. Finally, currClusters is placed in clusters.

Figure 7:
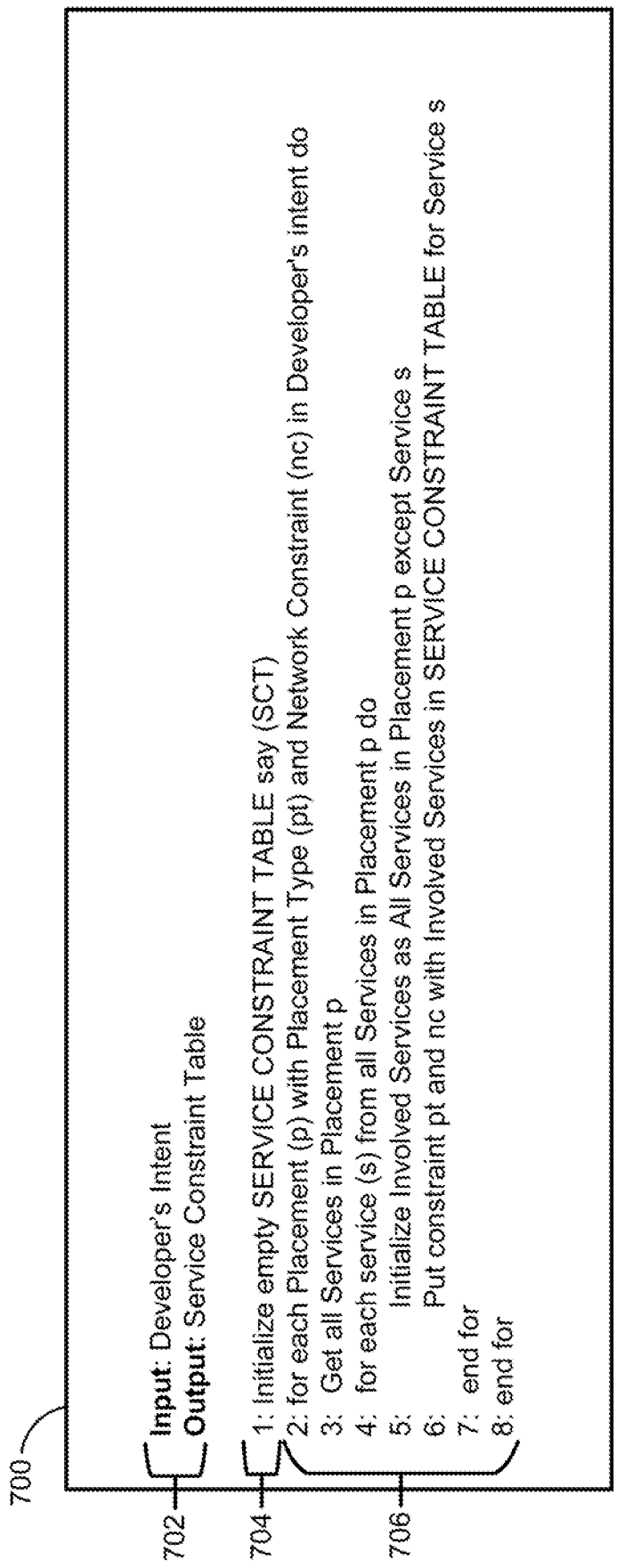
FIG. 7 depicts pseudocode for generating a service constraint table.

FIG. 7 depicts pseudocode 700 of an algorithm for building a service constraint table.

At pseudocode section 702, it is shown that an input to the algorithm is a developer's intent and an output from the algorithm is a service constraint table.

At pseudocode section 704, an empty service constraint table is initialized as SCT.

At pseudocode section 706, a number of operations are performed for each placement p with a placement type pt and a network constraint nc in the developer's intent. First, all services in placement p are retrieved. Next, for each service s from all services in p, an initialization is performed of involved services as all services in placement p except service s. Furthermore, constraint pt and nc are put with involved services in SCT for service s.

Figure 8:
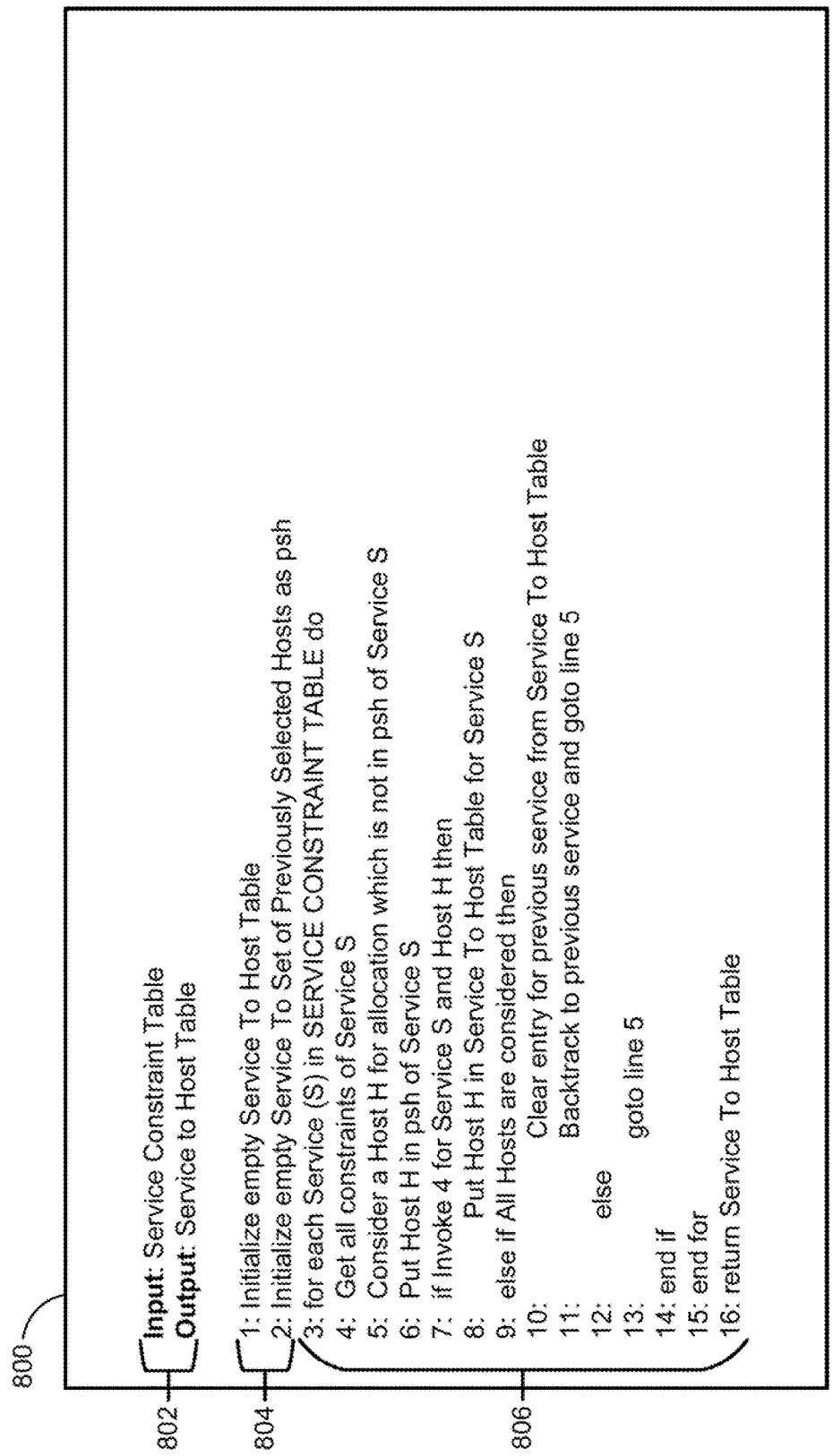
FIG. 8 depicts pseudocode for generating topology rules.

FIG. 8 depicts pseudocode 800 of an algorithm for topology rule generation.

At pseudocode section 802, it is shown that an input to the algorithm is a service constraint table and an output from the algorithm is a service to host table.

At pseudocode section 804, an empty service to host table is initialized and an empty service to set of previously selected hosts is initiated as PSH.

At pseudocode section 806, a number of operations are performed for each service s in the service constraint table. First, all constraints of service s are retrieved. Next, a host H is considered for allocation which is not in PSH of service s. The host H is then placed in PSH of service s. If an invocation has been performed for service s and host H, then host H is placed in the service to host table for service s. Otherwise, if all hosts are considered, then an entry for the previous service is cleared from the service to host table, a backtrack is performed to the previous service, and operations resume back at line 5 of pseudocode 800, where a host H is considered for allocation which is not in PSH of service s. Otherwise, if all hosts are not considered, operations simply return to line 5 of pseudocode 800.

Finally, the service to host table is returned.

FIG. 9 depicts pseudocode 900 of an algorithm for verifying service constraints.

At pseudocode section 902, it is shown that inputs to the algorithm include a service constraint table, a service as s, a host as H, a service to host table as S2H, and host network performance clusters as clusters. An output from the algorithm is true if constraints are satisfied and false if constraints are not satisfied.

At pseudocode section 904, services involved in a network constraint (ncServices) are retrieved from the service constraint table for service s.

At pseudocode section 906, for each service ncService in ncServices, if ncService is in S2H and host H is not in the same cluster as the host of ncService, then "false" is returned.

At pseudocode section 908, services involved in colocation (coloServices) are retrieved from the service constraint table for service s.

At pseudocode section 910, for each service coloService in coloServices, if coloService is in S2H and host H is not equal to the host of coloService, then "false" is returned.

At pseudocode section 912, services involved in isolation (isoServices) are retrieved from the service constraint table for service s.

At pseudocode section 914, for each service isoService in isoServices, if isoService is in S2H and host H is equal to the host of isoService, then "false" is returned.

Finally, at pseudocode section 916, "true" is returned if "false" has not already been returned at an early section.

It is noted that the algorithms discussed herein, such as with respect to FIGS. 6-9, are included as examples, and other sets of fewer or more steps may be used to perform operations described herein.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of service deployment, comprising:
    receiving, by an agent of a cloud provider, an indication of user intent for deployment of one or more services in a network from a user, the user being a consumer of cloud resources that does not have access to cloud topology information, wherein the indication of the user intent comprises a domain specific language (DSL);
    parsing, by the agent, the indication of the user intent to determine one or more constraints for deploying the one or more services, wherein the one or more constraints comprise one or more of:
        a topology constraint; or
        a network performance constraint;
    receiving topology information for the network, wherein the topology information comprises associations between racks and machines in the network;
    receiving network performance information for the network;
    determining one or more deployment rules for the one or more services based on the one or more constraints and one or more of: the topology information; or the network performance information; and
    deploying the one or more services in the network based on the one or more deployment rules.

2. The method of claim 1, wherein receiving the network performance information for the network comprises receiving measured values of one or more types of network performance information for pairs of the machines.

3. The method of claim 1, wherein determining the one or more constraints comprises determining a constraint related to rack co-location.

4. The method of claim 1, wherein determining the one or more constraints comprises determining a constraint related to a maximum or minimum value of a particular type of network performance information between given services of the one or more services.

5. The method of claim 1, wherein determining the one or more deployment rules for the one or more services comprises determining a mapping between a given service of the one or more services and a given machine of the machines.

6. The method of claim 1, further comprising:
    determining whether it is possible to deploy the one or more services according to the one or more constraints; and
    taking one or more actions based on whether it is possible to deploy the one or more services according to the one or more constraints.

7. The method of claim 1, further comprising:
    receiving updated topology information or updated network performance information; and
    determining one or more updated deployment rules for the one or more services based on the one or more constraints and the updated topology information or the updated network performance information.

8. A system, comprising one or more processors and a memory storing instructions that, when executed by the one or more processors, cause the system to perform a method of service deployment, the method comprising:
    receiving, by an agent of a cloud provider, an indication of user intent for deployment of one or more services in a network from a user, the user being a consumer of cloud resources that does not have access to cloud topology information, wherein the indication of the user intent comprises a domain specific language (DSL);
    parsing, by the agent, the indication of the user intent to determine one or more constraints for deploying the one or more services, wherein the one or more constraints comprise one or more of:
        a topology constraint; or
        a network performance constraint;
    receiving topology information for the network, wherein the topology information comprises associations between racks and machines in the network;
    receiving network performance information for the network;
    determining one or more deployment rules for the one or more services based on the one or more constraints and one or more of: the topology information; or the network performance information; and
    deploying the one or more services in the network based on the one or more deployment rules.

9. The system of claim 8, wherein receiving the network performance information for the network comprises receiving measured values of one or more types of network performance information for pairs of the machines.

10. The system of claim 8, wherein determining the one or more constraints comprises determining a constraint related to rack co-location.

11. The system of claim 8, wherein determining the one or more constraints comprises determining a constraint related to a maximum or minimum value of a particular type of network performance information between given services of the one or more services.

12. The system of claim 8, wherein determining the one or more deployment rules for the one or more services comprises determining a mapping between a given service of the one or more services and a given machine of the machines.

13. The system of claim 8, wherein the method further comprises:
   determining whether it is possible to deploy the one or more services according to the one or more constraints; and
   taking one or more actions based on whether it is possible to deploy the one or more services according to the one or more constraints.

14. The system of claim 8, wherein the method further comprises:
   receiving updated topology information or updated network performance information; and
   determining one or more updated deployment rules for the one or more services based on the one or more constraints and the updated topology information or the updated network performance information.

15. A non-transitory computer-readable medium comprising instructions that, when executed by one or more processors of a computing system, cause the computing system to perform a method of service deployment, the method comprising:
   receiving, by an agent of a cloud provider, an indication of user intent for deployment of one or more services in a network from a user, the user being a consumer of cloud resources that does not have access to cloud topology information, wherein the indication of the user intent comprises a domain specific language (DSL);
   parsing, by the agent, the indication of the user intent to determine one or more constraints for deploying the one or more services, wherein the one or more constraints comprise one or more of:
      a topology constraint; or
      a network performance constraint;
   receiving topology information for the network, wherein the topology information comprises associations between racks and machines in the network;
   receiving network performance information for the network;
   determining one or more deployment rules for the one or more services based on the one or more constraints and one or more of: the topology information; or the network performance information; and
   deploying the one or more services in the network based on the one or more deployment rules.

16. The non-transitory computer-readable medium of claim 15, wherein receiving the network performance information for the network comprises receiving measured values of one or more types of network performance information for pairs of the machines.

17. The non-transitory computer-readable medium of claim 15, wherein determining the one or more constraints comprises determining a constraint related to rack co-location.

18. The non-transitory computer-readable medium of claim 15, wherein determining the one or more constraints comprises determining a constraint related to a maximum or minimum value of a particular type of network performance information between given services of the one or more services.

19. The non-transitory computer-readable medium of claim 15, wherein determining the one or more deployment rules for the one or more services comprises determining a mapping between a given service of the one or more services and a given machine of the machines.

20. The non-transitory computer-readable medium of claim 15, wherein the method further comprises:
   determining whether it is possible to deploy the one or more services according to the one or more constraints; and
   taking one or more actions based on whether it is possible to deploy the one or more services according to the one or more constraints.

* * * * *